US012536801B2

(12) United States Patent
Jenni et al.

(10) Patent No.: US 12,536,801 B2
(45) Date of Patent: Jan. 27, 2026

(54) IDENTIFYING AND ALIGNING VIDEO CLIPS FROM LARGE-SCALE VIDEO DATASETS

(71) Applicant: Adobe Inc., San Jose, CA (US)

(72) Inventors: Simon Jenni, Hagendorf (CH); Ishan Rajendrakumar Dave, Oviedo, FL (US); Fabian David Caba Heilbron, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/653,577

(22) Filed: May 2, 2024

(65) Prior Publication Data
US 2025/0342699 A1 Nov. 6, 2025

(51) Int. Cl.
G06V 20/40 (2022.01)
G06F 16/735 (2019.01)
G11B 27/036 (2006.01)
G11B 27/10 (2006.01)

(52) U.S. Cl.
CPC ............ *G06V 20/48* (2022.01); *G06F 16/735* (2019.01); *G06V 20/41* (2022.01); *G06V 20/46* (2022.01); *G11B 27/036* (2013.01); *G11B 27/10* (2013.01)

(58) Field of Classification Search
CPC ........ G06V 20/48; G06V 20/46; G06V 20/41; G06F 16/735; G11B 27/036
See application file for complete search history.

(56) References Cited

U.S. PATENT DOCUMENTS

2012/0189212 A1* 7/2012 Ren ...................... G06F 16/783
382/218

OTHER PUBLICATIONS

Baraldi et al., "LAMV: Learning to align and match videos with kernelized temporal layers", In Proc. CVPR, pp. 7804-7813, 2018.
Benaim et al., "SpeedNet: Learning the Speediness in Videos", In Proceedings of the IEEE/CVF Conference on Computer Vision and Pattern Recognition, Jul. 26, 2020, 10 pages.
Black et al., "VADER: Video Alignment Differencing and Retrieval", arXiv preprint arXiv:2303.13193, Mar. 25, 2023, 10 pages.
Chen et al., "Frame-wise Action Representations for Long Videos via Sequence Contrastive Learning", In Proceedings of the IEEE/CVF Conference on Computer Vision and Pattern Recognition, Mar. 28, 2022, 11 pages.
Cuturi et al., "Soft-DTW: a Differentiable Loss Function for Time-Series", In International conference on machine learning, Feb. 20, 2018, 23 pages.
Douze et al., "Circulant temporal encoding for video retrieval and temporal alignment", IJCV, Nov. 30, 2015, 15 pages.

(Continued)

*Primary Examiner* — Girumsew Wendmagegn
(74) *Attorney, Agent, or Firm* — Nicholson De Vos Webster & Elliott LLP

(57) ABSTRACT

Embodiments are disclosed for retrieving videos for a semantic and temporal alignment between a pair of video clips. The method may include receiving a query video clip. The method may further include determining alignment ratios between the query video clip and one or more candidate video clips. The method may further include identifying an alignable video clip from the one or more candidate video clips based on the alignment ratios. The method may further include aligning the alignable video clip with the query video clip.

20 Claims, 8 Drawing Sheets

(56) References Cited

OTHER PUBLICATIONS

Dvornik et al., "Drop-DTW: Aligning Common Signal Between Sequences While Dropping Outliers", NeurIPS, 34, Aug. 26, 2021, 20 pages.

Dwibedi et al., "Temporal Cycle-Consistency Learning", In Proceedings of the IEEE/CVF conference on computer vision and pattern recognition, pp. 1801-1810, 2019.

Epstein et al., "OOPS! Predicting Unintentional Action in Video", In Proceedings of the IEEE/CVF Conference on Computer Vision and Pattern Recognition, pp. 919-929, 2020.

Fakhfour et al., "Video alignment using unsupervised learning of local and global features", arXiv preprint arXiv:2304.06841, Oct. 11, 2023, pp. 1-19.

Feichtenhofer et al., "SlowFast Networks for Video Recognition", In Proceedings of the IEEE/CVF international conference on computer vision, Oct. 29, 2019, 10 pages.

Fernando et al., "Self-Supervised Video Representation Learning With Odd-One-Out Networks", In Computer Vision and Pattern Recognition (CVPR), 2017 IEEE Conference, Apr. 5, 2017, pp. 1-10.

Hadji et al., "Representation Learning via Global Temporal Alignment and Cycle-Consistency", In Proceedings of the IEEE/CVF Conference on Computer Vision and Pattern Recognition, May 11, 2021, pp. 1-14.

Han et al., "Video Similarity and Alignment Learning on Partial Video Copy Detection", In Proc. ACM Int. Conf. Multimedia, Aug. 4, 2021, pp. 1-9.

Haresh et al., "Learning by Aligning Videos in Time", In Proceedings of the IEEE/CVF Conference on Computer Vision and Pattern Recognition, Aug. 17, 2023, pp. 1-15.

He et al., "TransVCL: Attention-Enhanced Video Copy Localization Network with Flexible Supervision", The Thirty-Seventh AAAI Conference on Artificial Intelligence (AAAI-23), pp. 799-807, 2023.

Jenni et al., "Audio-Visual Contrastive Learning with Temporal Self-Supervision", arXiv preprint arXiv:2302.07702, Feb. 15, 2023, pp. 1-9.

Jiang et al., "Partial Copy Detection in Videos: A Benchmark and An Evaluation of Popular Methods", IEEE Trans. Big Data, 2(1):32-42, 2016.

Lee et al., "Unsupervised Representation Learning by Sorting Sequences", In Proceedings of the IEEE International Conference on Computer Vision, Aug. 3, 2017, pp. 1-10.

Misra et al., "Shuffle and Learn: Unsupervised Learning using Temporal Order Verification", In Computer Vision—ECCV 2016: 14th European Conference, Proceedings, Part I 14, Jul. 26, 2016, pp. 1-21.

Meinard Müller, "Dynamic Time Warping", Information retrieval for music and motion, pp. 69-84, 2007.

Qian et al., "Spatiotemporal Contrastive Video Representation Learning", In Proceedings of the IEEE/CVF Conference on Computer Vision and Pattern Recognition, Apr. 5, 2021, pp. 1-13.

Tan et al., "A Fast Partial Video Copy Detection Using KNN and Global Feature Database", arXiv:2105.01713v2, Oct. 5, 2021, pp. 1-9.

Tran et al., "A Closer Look at Spatiotemporal Convolutions for Action Recognition", In Proceedings of the IEEE conference on Computer Vision and Pattern Recognition, Apr. 12, 2018, pp. 1-10.

Dave et al., "No More Shortcuts: Realizing the Potential of Temporal Self-Supervision", arXiv:2312.13008v1, Dec. 20, 2023, pp. 1-10.

Wei et al., "Learning and Using the Arrow of Time", In Proceedings of the IEEE Conference on Computer Vision and Pattern Recognition, pp. 8052-8060, 2018.

Zhang et al., "Modeling Video as Stochastic Processes for Fine-Grained Video Representation Learning", In Proceedings of the IEEE/CVF Conference on Computer Vision and Pattern Recognition, pp. 2225-2234, 2023.

* cited by examiner

IDENTIFYING AND ALIGNING VIDEO CLIPS FROM LARGE-SCALE VIDEO DATASETS

BACKGROUND

The ability to easily capture videos has resulted in an explosive growth of storing videos online. The content of the stored videos can vary, the perspective of the stored videos can vary (e.g., third person, first person) the editing of the stored videos can vary (e.g., insertion of audio effects, visual effects between scenes of the video, videos appearing visually sped up or slowed down), and the like. Accordingly, there can be a diverse range of videos that can be stored in a video database.

SUMMARY

Introduced here are techniques/technologies that perform aligned video retrieval by identifying videos with similar semantic events and temporally aligning the key events in a pair of videos. The aligned video retrieval (AVR) system described herein identifies a set of video clips that are semantically similar to a query video clip. The AVR system performs an alignability assessment by scoring how alignable each video clip from the set of semantically similar video clips is with respect to the query video clip. Subsequently, the AVR system temporally aligns the most alignable video clip from the set of semantically similar video clips with the query video clip.

More specifically, in one or more embodiments, given a query video clip, the AVR system described herein identifies a set of candidate video clips from a large collection of videos by parsing a video database for video clips having semantically similar content to the query video clip. The AVR system identifies an alignable video clip from the set of candidate video clips using an alignability indicator, which scores each video clip from the set of candidate video clips using a ratio of video alignment cost of an optimally aligned pair and a randomly aligned pair. The alignable video clip is temporally aligned to the query video clip by transferring the timing of key events in the query clip to the key events in the alignable video clip or vice-versa.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
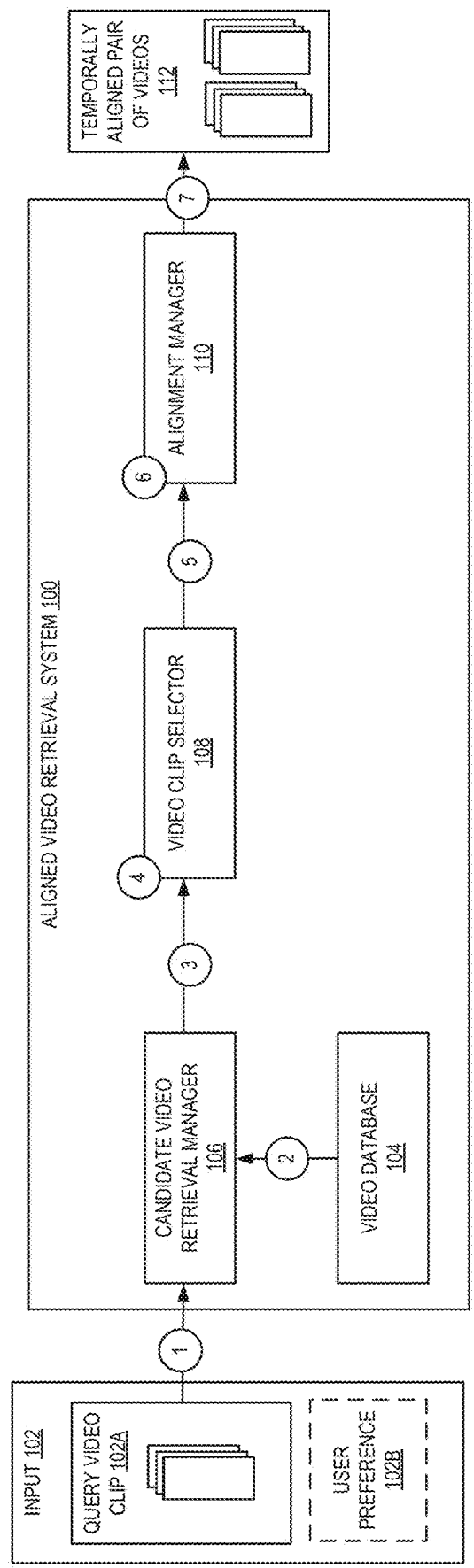
FIG. 1 illustrates a diagram of a process of retrieving a video for a semantic and temporal alignment between a pair of video clips, in accordance with one or more embodiments.

One or more embodiments of the present disclosure include an AVR system used to retrieve a video that is semantically similar to a query video clip and can be temporally aligned with the query video clip. Conventional approaches align key events between pairs of videos. However, these conventional approaches overly constrain the video alignment problem. For example, such approaches assume that the pairs of videos include semantically related key events. The problem of identifying videos with similar semantic events is a non-trivial task and is left to users to manually identify pairs of videos with similar semantic events from large-scale databases of videos. Other conventional approaches using a machine learning model trained to align pairs of videos. The video retrieval task learned by the machine learning models aims to search two query videos for semantically similar frames by recognizing key events or actions in each of the frames of the two videos. However, the training dataset used by the machine learning model to perform such tasks includes a limited number of videos, and the videos include a limited number of well-defined key events.

Accordingly, these conventional approaches may perform poorly on videos that do not conform to the well-defined key events used during training. For example, it may be difficult for conventional approaches to determine a temporally aligned frame in a second video given a frame in a first video that includes key events with overlapping action phases. Further, conventional approaches may perform poorly on videos with repetitions of key events. For example, it may be difficult for conventional approaches to determine temporally aligned frames for a video including a sequence of push-up repetitions (e.g., 3-4 push-ups at a time). Accordingly, such conventional approaches may temporally align frames with low accuracy based on appearance bias (e.g., aligning frames based on a first key event in the set of repeated key events without further evaluation).

To address these and other deficiencies in conventional systems, the AVR system of the present disclosure automatically retrieves a set of candidate videos from a large-scale database of videos. The set of candidate videos are semantically similar to a query video clip, and an alignable video clip from the set of candidate videos is temporally aligned with the query video clip. Knowledge of the semantic content of the video (e.g., action category) is insufficient alone to identify the alignable video clip. Instead, the AVR system identifies the alignable video clip based on a deep temporal evaluation of frames with semantically related key events. Identifying the alignable video clip from a large database of videos using the AVR system reduces computing resources associated with manually reviewing the content of each video clip in the database and subjectively determining whether each video clip includes similar semantic events to those events in the query video clip. As such, computing resources such as power and bandwidth are conserved. Additionally, identifying the alignable video clip as a video clip that is most temporally aligned to the query video clip reduces computing resources associated with temporally aligning a pair of video clips that are not optimally temporally aligned. That is, subsequent temporal aligning and re-aligning need not be performed, conserving computing resources such as power.

FIG. 1 illustrates a diagram of a process of retrieving a video for a semantic and temporal alignment between a pair of video clips, in accordance with one or more embodiments. As shown in FIG. 1, the aligned video retrieval (AVR) system 100 includes a candidate video retrieval manager 106, a video database 104, a video clip selector 108, and an alignment manager 110. While the video database 104 is shown as being included in the AVR system 100, in some embodiments, the video database 104 can be a remote database or datastore hosted by a third-party system other than AVR system 100. The AVR system 100 can be implemented as a standalone system and/or incorporated as part of a larger system or application. In some embodiments, AVR system 100 may be implemented as part of a cloud-based image and/or video editing processing suite of software. The user may access the AVR system 100 via a client application executing on their computing device (e.g., a desktop, laptop, mobile device, etc.). In some embodiments, the client application (or "app") may be an application provided by the AVR system 100 (or a service provider corresponding to the video processing system or other entity). Additionally, or alternatively, the user may access the AVR system 100 via a browser-based application executing in a web browser installed on the user's computing device. Additionally, or alternatively, the AVR system 100 may be implemented entirely or in part on the user's computing device.

At numeral 1, the candidate video retrieval manager 106 receives input 102. The input 102 includes query video clip 102A and in some embodiments, user preference 102B. Query video clip 102A is a sequence of a consecutive set of frames that portrays content. Each frame portrays a still image of content. The frames, when played at a playback speed (e.g., a number of frames per second) are perceived by a human as portraying motion. In some embodiments, query video clip 102A includes an entire set of consecutive frames (e.g., an entire duration of a video). In other embodiments, query video clip 102A includes a portion of the entire set of consecutive frames (e.g., a clip of the video).

The query video clip 102A can include one or more key events, where a key event is an object interaction or an action-phase transition. In an example, a video of a user swinging a golf club can include two key evets. The first key event occurs at the time the user begins to swing the golf club and the second key event occurs at the time the golf club makes contact with the golf ball.

The user preference 102B can indicate a preference for warping one particular video clip over another video clip. For example, the user preference 102B can be used by the alignment manager 110 and/or the video clip selector 108 to freeze characteristics of one video. In a non-limiting example, the user preference 102B may indicate that only the alignable video, determined by the video clip selector 102 described herein, is to be warped during temporal alignment. Accordingly, the query video clip 102A is not to be warped during temporal alignment (e.g., the temporal characteristics of the query video clip 102A are not manipulated and are therefore frozen). In some embodiments, the user preference 102B can indicate a set of videos to be used as the set of candidate videos. In some embodiments, the user preference 102B indicates one or more video databases (e.g., third party video databases, local video databases, etc.) from which to obtain the set of candidate videos. In some embodiments, the candidate video retrieval manager 106 retrieves additional candidate video clips to be included in the set of candidate video clips from the video database 104. In other embodiments, the candidate video retrieval manager 106 does not query the video database 104 for the set of candidate video clips because of the user preference 102B including the set of candidate video clips.

At numeral 2, the candidate video retrieval manager 106 retrieves a set of candidate video clips with similar semantic events to those events in the query video clip 102A. The candidate video retrieval manager 106 retrieves the set of candidate video clips from a large-scale video database such as video database 104. In some embodiments, the candidate video retrieval manager 106 can use an Application Program Interface (API) call to query the video database 104. An API refers to an interface or communication protocol in a pre-defined format between a client and a server, for instance. In response to receiving an API call, an action is initiated and generally a response is communicated. For example, the candidate video retrieval manager 106 uses an API call to communicate a request for candidate video clips that are semantically similar to the query video clip 102A stored in video database 104. Responsive to receiving the API call with request for content, the video database 104 communicates an API response with the set of candidate video clips. While one video database 104 is shown, in some embodiments, the candidate video retrieval manager 106 can query multiple video databases for candidate video clips using API calls, for instance. In some embodiments, the user uploads the set of candidate video clips with the query video clip 102A.

At numeral 3, the set of candidate video clips and the query video clip 102A are passed to the video clip selector 108 to identify an alignable video clip from the set of candidate video clips. For example, the set of candidate video clips can include video clips that include semantically similar content associated with the key event "cutting into a pineapple" included in the query video 102A. Some video clips in the set of candidate video clips may illustrate cutting a pineapple using a kitchen knife from the first-person perspective, some video clips in the set of candidate video clips may illustrate cutting a pineapple using a kitchen knife from the third person perspective, and some video clips in the set of candidate video clips may illustrate chopping a pineapple in the air using a sword. However, knowledge of the key events in a video clip alone can be insufficient to identify an alignable video clip and determine a pair of temporally aligned similar videos.

At numeral 4, the video clip selector 108 identifies the alignable video clip as the video clip in the set of candidate video clips with the lowest Dynamic Relative Alignment Quality (DRAQ) score. The DRAQ score is used as an alignability metric to identify pairs of semantically similar video clips based on a temporal understanding of the video clips. The DRAQ score represents the relative temporal alignment between a pair of video clips (e.g., the query video clip 102A and a video clip in the set of candidate video clips) using a per-frame representation of each video clip that captures global temporal information. The DRAQ score is independent of the lengths of each video clip of the pair of video clips, making it a robust score that can be used to quantify video alignment quality.

In some embodiments, the video clip selector 108 compares the DRAQ scores of pairs of video clips (e.g., query video clip 102A and a candidate video clip) to a threshold. In these embodiments, if a pair of video clips satisfies the threshold, then the video clip selector 108 determines that the pair of video clips are alignable. That is, a candidate video clip associated with the query video clip 102A is selected as an alignable video clip.

In some embodiments, the video clip selector 102 ranks pairs of video clips in order of increasing or decreasing DRAQ scores. In these embodiments, the video clip selector 108 selects a pair of alignable video clips responsive to selecting the video clip pair with the lowest DRAQ score in the order of ranked pairs of video clips. Accordingly, the alignable video clip is the candidate video clip of the pair of alignable video clips.

At numeral 5, the alignment manager 110 receives the query video clip 102A and the alignable video clip. At numeral 6, the alignment manager 110 temporally aligns the query video clip 102A with the alignable video clip. A pair of video clips is temporally aligned when a key event in both video clips occurs simultaneously (e.g., co-occurs exactly, coincides). One or both of the video clips of the pair of video clips (e.g., query video clip 102A and the alignable video clip) may be warped such that the key event visually occurs at the same time (or near the same time). In some embodiments, the user preference 102B can indicate the user preference to warp only the alignable video clip and not the query video clip. Warping one or both of the video clips of the pair of video clips includes digitally manipulating the frame rate (e.g., number of frames per second) of the video clip such that the content in the pair of video clips is sped-up or slowed-down. Speeding up or slowing down the content of the video clip can warp the content of one or both of the video clips of the pair of video clips such that the content of the pair of video clips appears temporally synchronized. That is, the content in each of the video clips is played back to a user such that the user perceives the content as occurring in each of the video clips at the same time or near the same time.

At numeral 7, the AVR system 100 outputs temporally aligned pairs of video clips 112. The temporally aligned pair of video clips 112 includes the query video clip 102A and a candidate from the set of candidate clips that is most alignable with the query video clip 102A (e.g., an alignable video clip). The temporal alignment of the pair of video clips means the timing of events (including key audio events and key visual events) is transferred from one video clip to another video clip (e.g., from the query video clip 102A to the most alignable candidate video clip from the candidate set of video clips).

Figure 2:
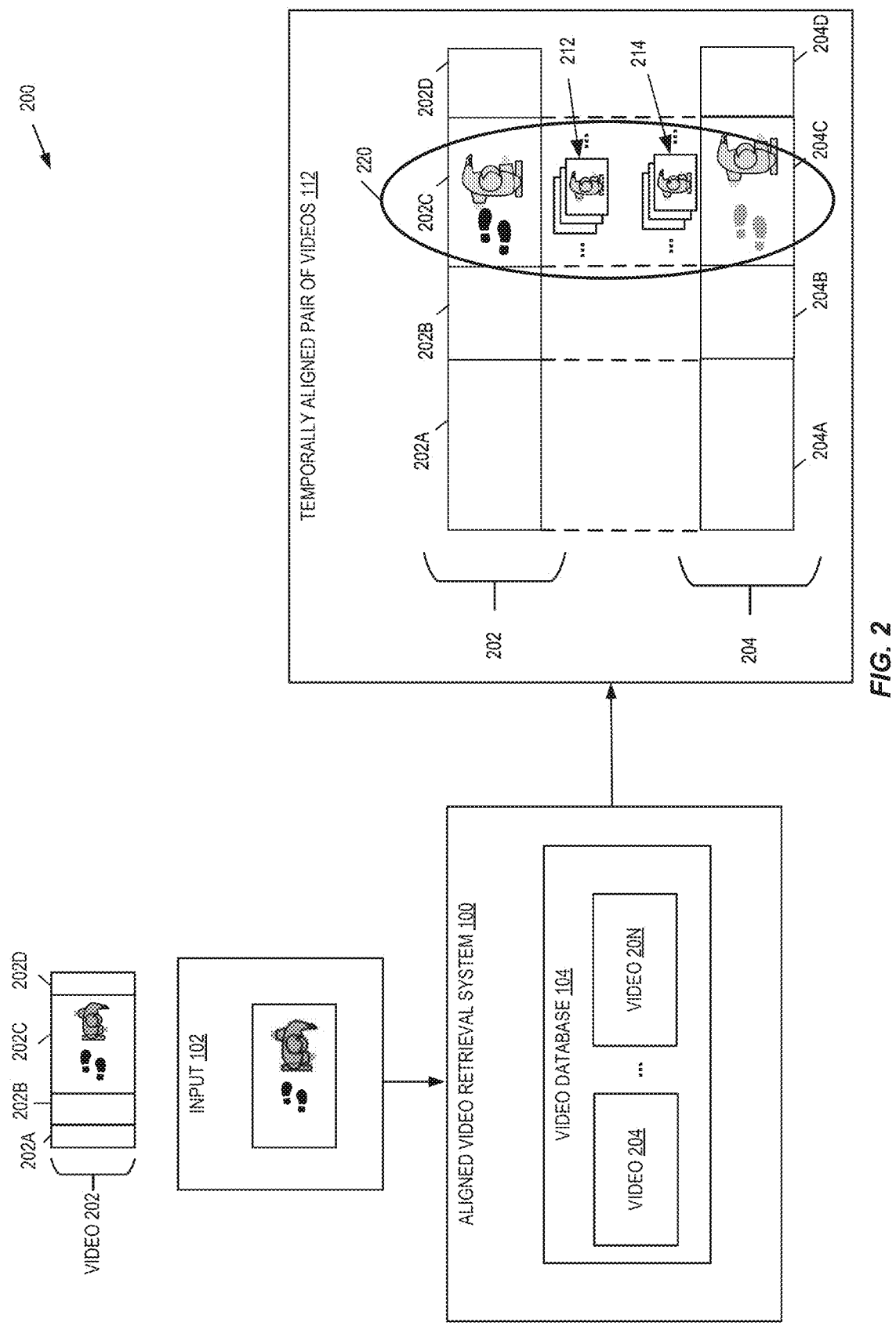
FIG. 2 illustrates an example of a temporally aligned video clip of a pair of videos, in accordance with one or more embodiments.

FIG. 2 illustrates an example of a temporally aligned video clip of a pair of videos, in accordance with one or more embodiments. In example 200, video 202 includes video clips, which are segments of video 202. For example, video clip 202 includes video clip 202A, 202B, 202C, and 202D. In the example 200, a query video clip is video clip 202C. The query video clip 202C is input to the AVR system 100 as query video clip 102A described above. As described herein, the video database 104 can store N videos such as video 204-20N. The AVR system 100 performs the methods and processes described herein to identify alignable video clip 204C of video 204 from the video database 104.

The output of the AVR system 100 is an alignable pair of video clips 202C and 204C, as represented by alignment 220. As shown, video clip 202C and video clip 204C are semantically similar (e.g., both include representations of a man walking). As described above, video clips include a sequence of frames. For example, video clip 202C includes a sequence of frames 212 and video clip 204C includes a sequence of frames 214. The temporal alignment of video clips 202C and 204C includes the temporal alignment of frames 212 of video clip 202C and frames 214 of video clip 204C. While video 202 and video 204 are shown with an equal number of video clips, as described herein, video 202 and video 204 can be different lengths and therefore each include a different number of video clips. In some embodiments, video 202 and video 204 are referred to herein as video clips.

Example 200 illustrates the AVR system 100 acting at the video-clip level (e.g., identifying alignable video clip 204C using query video clip 202C). In some embodiments, each clip of video 200 can be passed to the AVR system 100 to identify an alignable video clip. In some embodiments, if videos stored in video database 104 have semantically similar clips to the video clips of video 202 (e.g., video clip 202A, 202B, 202C, and 202D), then video 202 can be passed as a query input to the AVR system 100.

Figure 3:
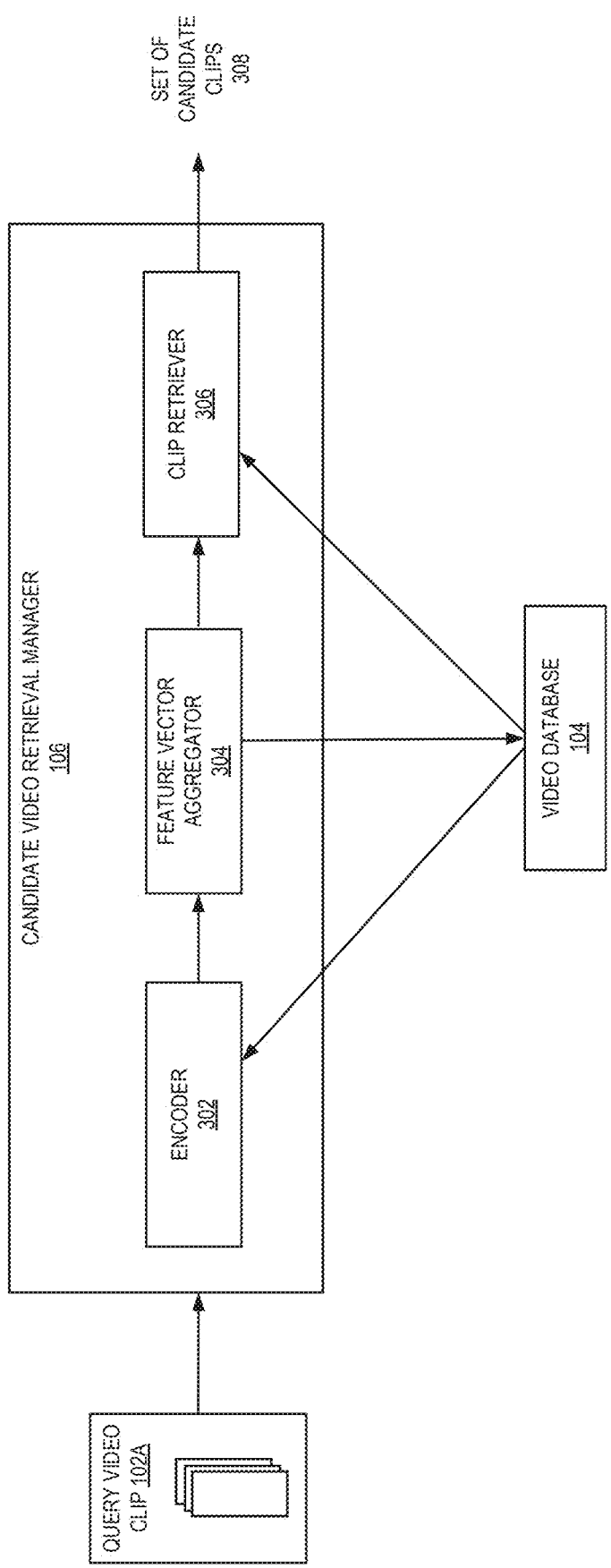
FIG. 3 illustrates an example of the candidate video retrieval manager, in accordance with one or more embodiments.

FIG. 3 illustrates an example of the candidate video retrieval manager, in accordance with one or more embodiments. The candidate video retrieval manager 106 retrieves a set of candidate video clips from a large-scale video database such as video database 104. The set of candidate video clips are semantically similar to the query video clip 102A.

In operation, the encoder 302 of the candidate video retrieval manager 106 generates a feature representation of the query video clip 102A. The encoder 302 can be any pretrained encoder or fine-tuned encoder trained to generate per-frame feature vectors of frames of a video clip. A feature vectors is a mathematical representations of a frame that represents the properties or characteristics of the frame. Given a video $V_i \in \mathbb{R}^{T \times H \times W \times 3}$ with three channels (e.g., Red, Green, Blue channels) consisting of T frames of size H×W, the encoder 302 generates T frame-level features for video $V_i$, mathematically represented as $$F_i = [f_1^i, \ldots, f_T^i] \in \mathbb{R}^{T \times d}.$$

The vector $F_i$ is sequence of feature vectors (e.g., a vector of feature vectors), where each frame-level feature vector $$f_j^i$$

has a size of d.

A neural network (such as encoder 302) may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

The feature vector aggregator 304 aggregates the set of frame-level feature vectors $$f_j^i$$

of the video $V_i$ received from the encoder 302 to determine a representative of a set of a number of T frame-level feature vectors (e.g., a video clip-level feature vector). The video clip-level feature vector determined for each set of frame-level feature vectors can be represented mathematically by $$\overline{F}_t = \frac{1}{T}\sum_{j=1}^{T} f_j^i.$$

The video clip-level feature vector represents the average of the frame-level feature vectors representing video clip $V_i$. In some embodiments, the feature vector aggregator 304 can aggregate frame-level feature vectors of a segment with a number of t frames. For example, the aggregated frame-level feature vectors of a segment with t frames can be determined using $$\frac{1}{t}\sum_{j=1}^{l+t} f_j^i.$$

In some embodiments, the feature vector aggregator 304 aggregates multiple segments, to retrieve for example, coarse temporally localized candidate clips for the candidate set of clips.

In some embodiments, frames of each video Vs stored in the video database 104 are encoded as frame-level feature vectors (e.g., $$f_j^s)$$

and aggregated as $$\overline{F}_s = \frac{1}{T}\sum_{j=1}^{T} f_j^s$$

by the encoder 302 and feature vector aggregator 304 respectively. Accordingly, the video database 104 stores video clip-level feature vectors $\overline{F}_s$ for a set of T frames or aggregated frame-level feature vectors of a segment of a video with t frames (referred to collectively as stored feature vectors). In some embodiments, the stored feature vectors are standardized using the mean and/or standard deviation value determined from the stored feature vectors in the video database 104. In some embodiments, the stored clip-level feature vectors $\overline{F}_s$ are stored in the video database 104 such that similar clip-level feature vectors $\overline{F}_s$ are stored closer together. For example, cosine similarity is applied to pairs of stored feature vectors to quantify the similarity between the stored feature vectors. In operation, the value of the cosine of the angle between the compared stored feature vectors indicates a similarity of the stored feature vectors. For example, higher, positive values (closer to 1) indicate greater degrees of similarity and lower, negative values (closer to 0) indicate greater degrees of dissimilarity. As a result, video clips stored in the video database 104 can be stored in a nearest-neighbor data structure such that similar video clips (defined by similar stored feature vectors determined via cosine similarity, for instance) are stored closer to one another than dissimilar video clips.

In some embodiments, the clip retriever 306 retrieves one or more stored videos from the video database 104 using the aggregated feature vector of the stored videos $\overline{F}_s$ (e.g., stored video clip-level feature vectors) and the aggregated feature vector of the query video clip $\overline{F}_t$ (e.g., video clip-level feature vectors). Because the video clip-level feature vector represents the average of the frame-level feature vectors of a video clip, the clip retriever 306 advantageously selects one or more stored videos (and/or video clips) from the video database 104 based on the encoded full video clip and not any single frame of the video clip. As a result of the video database arranged in a nearest neighbor data structure, the clip retriever 306 can search through the video database 104 in a scalable manner. For example, the clip retriever 306 applies cosine similarity to the video clip-level feature vector of the query video clip 102A and a stored video clip-level feature vector of a stored video clip to quantify the similarity between the video clip-level feature vectors. The comparison of the video clip-level feature vector of the query video clip 102A and the stored video clip-level feature vector of the stored video clip produces a similarity score. Stored video clips associated with stored video clip-level feature vectors whose similarity scores satisfy a threshold similarity score are retrieved from the video database 104. In some embodiments, the k most similar stored video clips associated with video clip-level feature vectors whose similarity scores satisfy the threshold similarity score are retrieved from the video database 104. In some embodiments, the k most similar stored video clips are the video clips stored near the video clip in the video database 104 associated with video clip-level feature vectors that scored above the threshold similarity score in part, because of the nearest neighbor storage of video clips in the video database. Accordingly, the output of the candidate video retrieval manager 106 includes k video clips that are similar to the query video clip. The k video clips form the set of candidate video clips 308.

Figure 4:
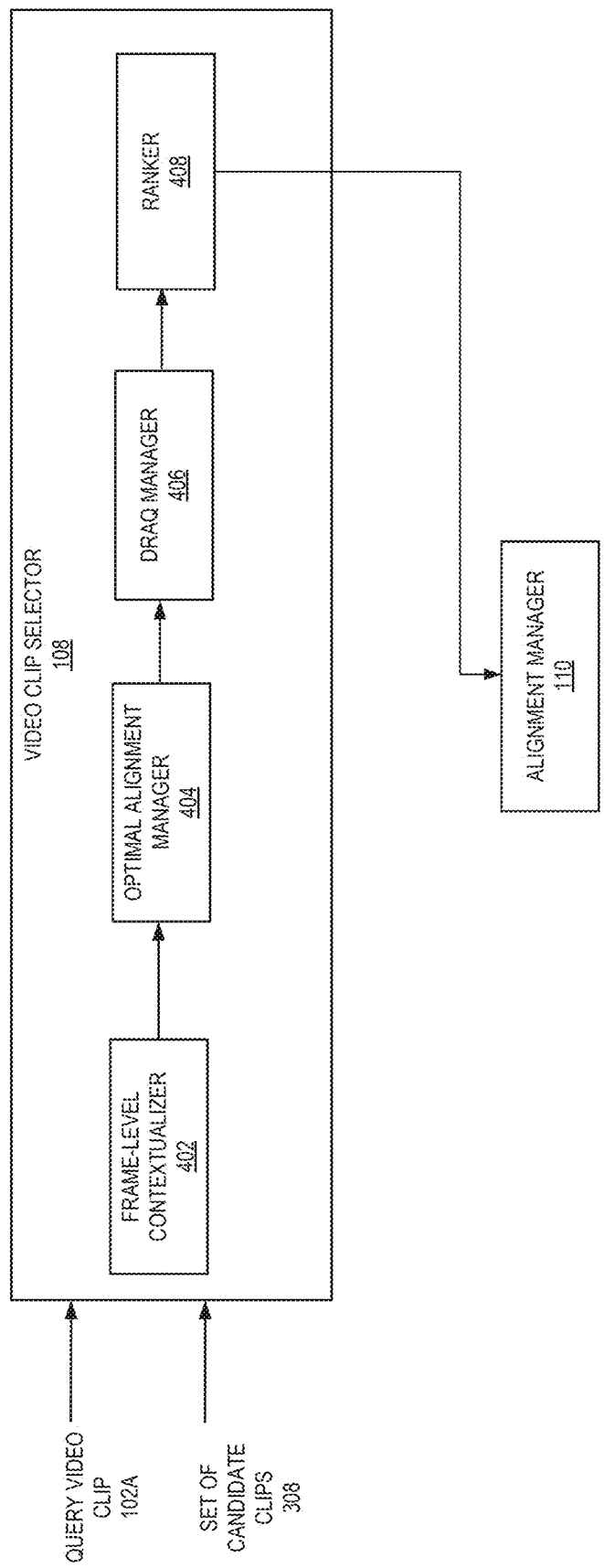
FIG. 4 illustrates an example of the video clip selector and the alignment manager, in accordance with one or more embodiments.

FIG. 4 illustrates an example of the video clip selector and the alignment manager, in accordance with one or more embodiments. The video clip selector 108 uses a DRAQ score to rank videos of a set of candidate videos. DRAQ is a metric used to identify an alignable video clip from a set of retrieved candidate video clips by scoring how alignable two video clips are. In other words, the video clip selector 108 ranks each video of the set of candidate videos such that higher ranked videos have a higher correlation with key-event agreement between the ranked video and the query video clip 102A.

The video clip selector 108 receives the query video clip 102A or data associated with the query video clip 102A such as the frame-level feature vector of the video $V_i$ (e.g., $$f_j^i)$$

or the aggregated frame-level feature vector of the video $V_i$ (e.g., clip-level feature vector $\overline{F}_t$). The video clip selector 108 also receives the set of candidate video clips 308 or data associated with each candidate video clip of the set of candidate video clips 'B08 such as the frame-level feature vectors of the candidate video clip (e.g., $$f_j^s)$$

or the aggregated frame-level feature vector of the candidate video clip (e.g., clip-level feature vector $\overline{F}_s$).

The frame-lever contextualizer 402 augments frame-level feature vectors with additional temporal context such that the alignment manager 110 can perform temporal clip alignment. The frame-level feature temporal contextualization can be applied to any frame-level representation and any video clip length. After the temporal context augmentation, a frame-level feature vector captures not only the features associated with the single frame, but also how the frame fits into the overall video clip. For example, the frame-level contextualizer 402 augments each frame with temporal context information that represents whether the particular frame is part of the beginning of the video clip or near the end of the video clip.

In operation, the frame-level contextualizer 402 concatenates each frame-level feature vector $$f_j^i$$

(e.g., determined by the encoder 302 in FIG. 3) with the cumulative sum of frame-level feature vectors up to the particular frame-level feature vector. In other words, each frame-level feature vector $$f_j^i$$

is concatenated with an additional feature vector that represents an average of all of the prior feature vectors of the feature vector sequence in $F_i$. Mathematically, this is represented according to Equation (1) below:

$$\overline{f}_j^i = f_j^i \oplus \frac{1}{T}\sum_{t=1}^{j} f_t^i \in \mathbb{R}^{T \times 2d} \quad (1)$$

In Equation (1), $\oplus$ represents concatenation along the channel dimension for a video $V_i$ including T frames and frame-level vectors $$f_j^i.$$

As a result of the concatenation, the augmented feature vector $$\overline{f}_j^i$$

is twice the dimension of the feature vector $$f_j^i.$$

In some embodiments, the frame-level contextualizer 402 also standardizes the frames per video using zero centering. Mathematically, this is represented according to Equation (2) below:

$$\hat{f}_i^1 = \overline{f}_i^1 - \frac{1}{T}\sum_{t=1}^{T}\overline{f}_t^1 \quad (2)$$

The frame-level contextualizer 402 similarly determines a frame-level feature vector with augmented temporal information for each video clip in the set of candidate clips 308 (e.g., $$\overline{f}_s^i).$$

In some embodiments, the frame-level feature vectors are standardized according to Equation (2) above. Given the query video clip $V_1$ with n frames and a candidate video clip $V_2$ with m frames of the set of candidate clips, the frame-level contextualizer 402 generates augmented frame-level feature vectors $$\hat{f}_i^1 \text{ and } \hat{f}_j^2.$$

The optimal alignment manager 404 uses a distance metric to determine how similar a video clip of the set of candidate video clips 308 is to the query video clip 102A by determining how alignable the video clip of the set of candidate video clips 308 is with respect to the query video clip 102A. For example, the optimal alignment manager 404 can perform dynamic time warping to determine the optimal alignment of a video in the set of candidate video clips 308 and the query video clip 102A. While dynamic time warping is described herein, it should be appreciated that other distance metrics can be used to determine how alignable a video clip of the set of candidate video clips 308 is with respect to the query video clip 102A.

Given the query video clip $V_1$ with n frames and a candidate video clip $V_2$ with m frames of the set of candidate video clips, the optimal alignment manager 404 determines a cost matrix $C \in \mathbb{R}^{n \times m}$ to quantify the similarity between the augmented feature vectors $$\hat{f}_i^1 \text{ and } \hat{f}_j^2$$

from the query video clip $V_1$ and the candidate video clip $V_2$ respectively. The optimal alignment manager 404 determines the cost matrix C according to Equation (3) below:

$$C(i,j) = 1 - \frac{\hat{f}_i^1 \cdot \hat{f}_j^2}{\|\hat{f}_i^1\|\|\hat{f}_j^2\|} \quad (3)$$

In Equation (3) above, $$\hat{f}_i^1 \cdot \hat{f}_j^2$$

represents the dot product between the temporally augmented frame-level feature vectors $$\hat{f}_i^1 \text{ and } \hat{f}_j^2 \text{ and } \|\hat{f}_i^1\| \|\hat{f}_j^2\|$$

represents the vector norm between the temporally augmented frame-level feature vectors $$\hat{f}_i^1 \text{ and } \hat{f}_j^2.$$

Accordingly, each entry in the cost matrix C represents the pairwise similarity between temporally augmented feature vectors $$\hat{f}_i^1 \text{ and } \hat{f}_j^2$$

from the query video clip $V_1$ and the candidate video clip $V_2$ respectively.

After generating the cost matrix C, the optimal alignment manager 404 determines the optimal alignment path using a distance metric such as dynamic time warping. The optimal alignment path (e.g., $P_{DTW}$) is the path that traverses the cost matrix C while minimizing the cumulative cost through the cost matrix C. In other words, the optimal path is the path through the cost matrix C that represents the least distance between the temporally augmented feature vectors $$\hat{f}_i^1 \text{ and } \hat{f}_j^2,$$

meaning the frames of the query video clip $V_1$ and the candidate video clip $V_2$ that are the most aligned (e.g., semantically). The cost of the optimal alignment path is the minimum cumulative cost through the cost matrix C.

A path P is represented by indexes in the cost matrix C that refer to temporally augmented feature vectors $$\hat{f}_i^1 \text{ and } \hat{f}_j^2.$$

For example, a path P can be represented using tuples $P=((i_1,j_1), (i_2,j_2), \ldots (i_L,j_L))$. The length of the path L is less than the number features in the feature vector of temporally augmented frame-level feature vectors $$\hat{f}_i^1 \text{ and } \hat{f}_j^2.$$

In other words, the length of the path L is less than the number of frames of the query video clip $V_1$ and the candidate video clip of the candidate set of clips $V_2$ such that $L \leq n+m$. Each path P through the cost matrix C satisfies three conditions.

The first condition of a path P is the boundary condition which fixes the endpoints of the path. For example, the endpoints of the path P may be located at the top-left element $(i_1,j_1)$ of the cost matrix C at (1,1) and the bottom right element $(i_L,j_L)$ of the cost matrix C at (n,m). The boundary condition ensures that the first elements and the last elements of the query video clip $V_1$ and the candidate video clip $V_2$ are aligned. For example, the first entry of the path P beginning at (1,1,) represents the frame index of the query video clip (e.g., frame 1) and the frame index of the candidate video clip of the candidate (e.g., frame 1). The second condition of a path P is the monotonicity condition, which ensures that the timing of the query video clip $V_1$ and the candidate video clip $V_2$ is maintained. Mathematically, this is represented as $i_1 \leq i_2 \leq \ldots \leq i_L$ and $j_1 \leq j_2 \leq \ldots \leq j_L$. The third condition of a path P is the step size condition which defines a continuity of the path. That is, each iteration, the path traverses through the cost matrix C by moving in step sizes of (0,1), (1,0) or (1,1). The optimal alignment path $P_{DTW}$ is the path P with the minimal total cost among all possible paths P and is computed according to Equation (4) below:

$$D(i, j) = C(i, j) + \min D(i - u, j - v) \quad (4)$$

Where $(u, v) \in [(0, 1), (1, 0), (1, 1)]$

In Equation (4) above, D(i,j) is computed recursively where each entry in D(i,j) represents the minimum cumulative cost of aligning the query video clip $V_1$ and the candidate video clip $V_2$. In some embodiments, the optimal alignment path $P_{DTW}$ is determined by tracing D(i,j) backwards, starting at D(n,m) and incrementally moving backwards to D(1,1) where the selection of each step is based on the direction that resulted in the minimal cumulative cost.

In some embodiments, only one video of $V_1$ or $V_2$ is warped. For example, responsive to a user preference indicated via user preference 102B, one video $V_1$ or $V_2$ is to remain unwarped. In these embodiments, any paths P that include repeated consecutive indices of the video to remain unwarped are removed. Repeated consecutive indices of a video represent frames of the video that are effectively held in time (or otherwise distorted). As a result, the optimal alignment path $P_{DTW}$ is selected from a path P that excludes elements of the video to remain unwarped. In other embodiments, if the optimal path $P_{DTW}$ includes repeated consecutive indices of the to remain unwarped, such indices of the optimal path are skipped.

The DRAQ Manager 406 assesses the temporal alignment between videos $V_1$ and $V_2$. The DRAQ manager 406 compares an optimal alignment cost (e.g., the minimum cumulative cost through the cost matrix C) to the average cost of multiple random alignments (e.g., the cumulative cost through the cost matrix C of an average number of random alignments) using an alignment ratio. If the DRAQ manager 406 determines that the optimal alignment cost is lower than a random alignment cost, then the DRAQ manager 406 determines that the video clips are temporally aligned. Accordingly, lower DRAQ scores indicate that the two video clips are temporally aligned.

The DRAQ manager 406 generates k random alignment paths in the cost matrix C to determine a baseline cost of random alignment. In operation, the DRAQ manager 406 starts at a location in the cost matrix C and at each iteration, moves a step $(\delta_i, \delta_j)$ in a direction until a target location is reached. Any steps equaling $(\delta_i, \delta_j)=(0,0)$ are ignored.

In some embodiments, the direction of a step $(\delta_i, \delta_j)$ in an iteration is determined according to direction probabilities that are proportional to i and j, where i and j are the remaining number of frames to be aligned in video $V_1$ and candidate video $V_2$ respectively. For example, if the random alignment path starts at (n,m) and the target location is (1,1), the direction probabilities for each step are determined according to Equation (5A) below:

$$\delta_i = -1 \text{ with probability}_{up} = \frac{i}{i+j} \quad (5A)$$

$$\delta_j = -1 \text{ with probability}_{left} = \frac{j}{i+j}$$

In other words, the direction probabilities are proportional to how far away the target location is from the current position in the cost matrix C. In some embodiments, a step $(\delta_i, \delta_j)$ in an iteration is determined based on i and j. If the random alignment path starts at (1,1) and the target location is (n,m), the direction of the step at each iteration is determined according to Equation (5B) below:

$$\delta_i + 1 \text{ if } i+1 \le n \quad (5B)$$
$$\delta_j + 1 \text{ if } j+1 \le m$$
$$(\delta_i, \delta_j) = (i+1, j+1) \text{ if } i+1 \le n \text{ and } j+1 \le m$$

In other embodiments, the direction of each step is equally likely. All of the entries in C corresponding to the random alignment path are summed to determine the cost of a first random alignment. A number of k random alignment paths are generated using the cost matrix C such that the DRAQ manager 406 can determine the cost of k random alignments. The DRAQ manager 406 averages each cost of the k random alignments to determine $\text{Cost}_{random}$. As described above, the DRAQ manager 406 can also determine the cumulative cost of the optimal alignment path by summing each entry in C corresponding to the optimal alignment path $P_{DTW}$. The DRAQ score (e.g., an alignment ratio score) is the ratio of the cumulative cost along the optimal alignment path to the average cost of k random alignment paths. This is mathematically represented according to Equation (6) below:

$$DRAQ = \frac{\text{Cost}_{Optimal}}{\text{Cost}_{Random}} \quad (6)$$

The ranker 408 ranks each video clip of the candidate set of clips 308 according to the DRAQ score, where video clips with lower DRAQ scores are ranked higher than video clips with higher DRAQ scores. In some embodiments, the candidate video clip in the highest-ranking position (e.g., the video clip of the candidate set of video clips with the lowest DRAQ score) is selected as the most alignable video clip with respect to the query video clip 102A. In some embodiments, the ranker 408 determines whether the DRAQ score of each pair of query video clip and candidate video clip of the candidate set of video clips satisfies a DRAQ threshold. If the DRAQ score of the pair of video clips satisfies the DRAQ threshold, the ranker 408 generates a subset of candidate video clips and adds the video clip of the set of candidate video clips to the subset of candidate video clips. If the DRAQ score of the pair of videos does not satisfies the DRAQ threshold, then the ranker 408 does not add the candidate video clip of the set of candidate video clips to the subset of candidate video clips. Accordingly, the subset of candidate video clips includes video clips of the candidate set of clips that satisfy the DRAQ threshold.

As described with reference to FIG. 1, the alignment manager 110 receives the query video clip 102A and the alignable video clip from the video clip selector 108. The alignment manager 110 uses the optimal alignment path (or some other distance metric) determined from the optimal alignment manager 404 to align the frames of the query video clip 102A with the alignable video clip. In other words, the alignment manager 110 uses the optimal alignment path $P_{DTW}$ to assign frames of the query video clip 102 to frames of the alignable video clip to warp (or otherwise align) the query video clip 102 and the alignable video clip in a nonlinear fashion. In operation, the tuples of the optimal path $P_{DTW}$ representing indices of the cost matrix C assign frames of the query video 102 to the corresponding frame of the alignable video clip.

Figure 5:
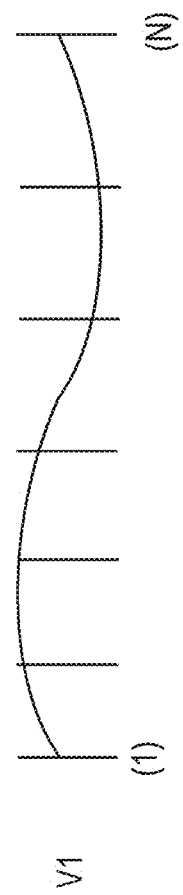
FIG. 5 illustrates an example path of a cost matrix determined using augmented feature vectors, in accordance with one or more embodiments.
Figure 5:
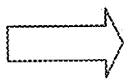
Figure 5:
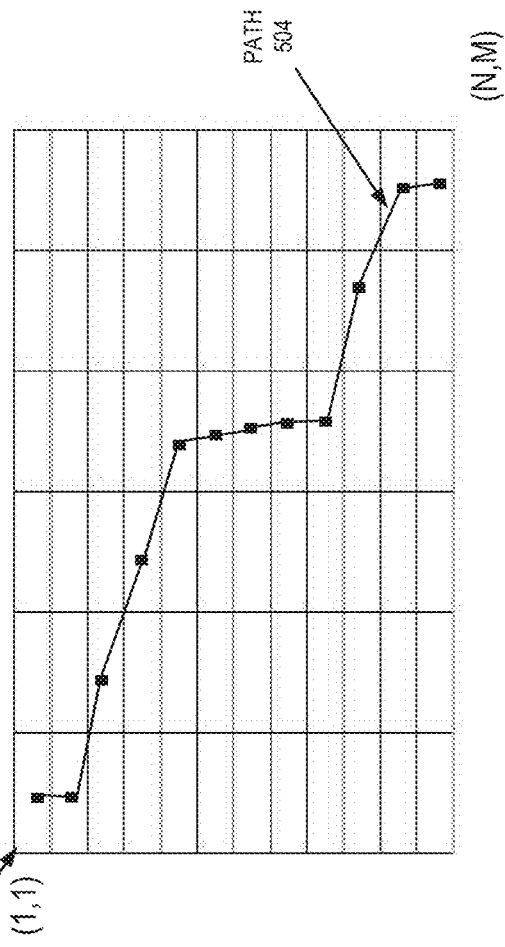
Figure 5:
Figure 5:
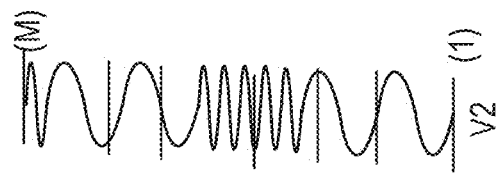

FIG. 5 illustrates an example path of a cost matrix determined using augmented feature vectors, in accordance with one or more embodiments. As described herein, frame-level feature vectors augmented with temporal context $$\hat{f}_i^1 \text{ and } \hat{f}_j^2$$

are determined for video clips $V_1$ and $V_2$ respectively, where video clip $V_1$ is the query video clip 102A with n frames and video clip $V_2$ is a candidate video clip of the set of candidate video clips 308 with m frames. Each element of the frame level feature vector augmented with temporal information $$\hat{f}_i^1 \text{ and } \hat{f}_j^2$$

is used to determine an entry of the cost matrix 502 (e.g., described in Equation (3) above). The entries of the cost matrix 502 quantify the similarity between the frame-level feature vectors augmented with temporal information. Path 504 represents one path of a set of paths possible starting from position (1,1) in the cost matrix 502 (which represents the beginning of the video clips $V_1$ and $V_2$) and ending at position (n,m). The optimal path $P_{DTW}$ is the path P (not shown) with the minimum cumulative cost of each entry in the cost matrix 502, representing frame-level feature vectors augmented with temporal information $$\hat{f}_i^1 \text{ and } \hat{f}_j^2$$

that are the similar. In other words, the optimal path $P_{DTW}$ represents the most alignable frames in the videos $V_1$ and $V_2$.

Figure 6:
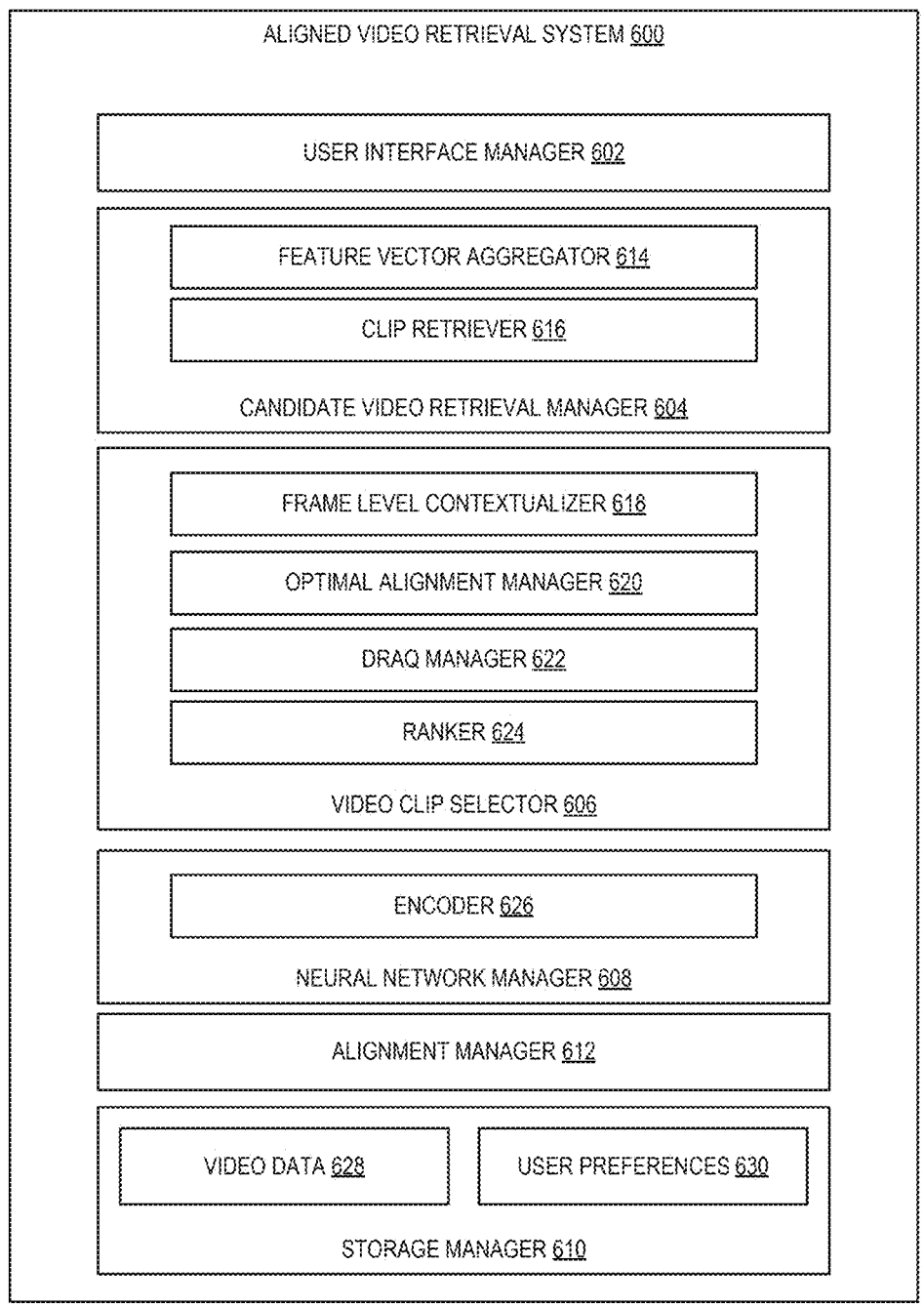
FIG. 6 illustrates a schematic diagram of an Aligned Video Retrieval system in accordance with one or more embodiments.

FIG. 6 illustrates a schematic diagram of an Aligned Video Retrieval system (e.g., "AVR system" described above) in accordance with one or more embodiments. As shown, the AVR system 600 may include, but is not limited to, a user interface manager 602, a candidate video retrieval manager 604, a video clip selector 606, a neural network manager 608, an alignment manager 612, and a storage manager 610. The candidate video retrieval manager 604 includes a feature vector aggregator 614 and a clip retriever 616. The video clip selector 606 includes a frame-level contextualizer 618, an optimal alignment manager 610, a DRAQ manager 622, and a ranker 624. The neural network manager 608 includes an encoder 626. The storage manager 610 can include video data 628 and user preferences 630.

As illustrated in FIG. 6, the AVR system 600 includes a user interface manager 602. For example, the user interface manager 602 allows users to provide a query video clip to the AVR system 600. In some embodiments, the user interface manager 602 provides a user interface through which the user can upload the query video clip. Alternatively, or additionally, the user interface may enable the user to download the query video clip from a local or remote storage location (e.g., by providing an address (e.g., a URL or other endpoint) associated with the query video clip). In some embodiments, the user interface can enable a user to link an image capture device, such as a camera or other hardware to capture video data and provide it to the AVR system 600.

Additionally, the user interface manager 602 allows users to request the AVR system 600 to retrieve semantically relevant candidate video clips to be temporally aligned with the query video clip. The user interface manager 602 allows the user to input user preferences, indicating whether the user prefers the query video clip to be warped during the temporal alignment of the query video clip and the semantically relevant retrieved video clip. In some embodiments, the user interface manager 602 enables the user to view the resulting temporally aligned retrieved semantically relevant video clip and query video clip.

As illustrated in FIG. 6, the AVR system 600 includes a candidate video retrieval manager 604. The candidate video retrieval manager 604 retrieves a set of candidate video clips with similar semantic events to those events in the query video clip. The set of candidate video clips can be retrieved from a large-scale video database.

The candidate video retrieval manager 604 includes the feature vector aggregator 614. The feature vector aggregator 614 aggregates a set of frame-level feature vectors to determine a video clip-level feature vector (e.g., a representative of a set of a number of frame-level feature vectors). The feature vector aggregator 614 generates video-clip level feature vectors of the query video and videos stored in a video database.

The candidate video retrieval manager 604 includes the clip retriever 616. The clip retriever 616 retrieves one or more stored video from the video database using the video clip-level feature vector of the query clip and the video clip-level feature vector of the stored videos in the video database. Because the video clip-level feature vector represents the average of the frame-level feature vectors of a video clip, the clip retriever 616 advantageously selects one or more stored videos (and/or video clips) from the video database based on the encoded full video clip and not any single frame of the video clip. In operation, the clip retriever 616 applies cosine similarity to the video clip-level feature vector of the query video clip and a stored video clip-level feature vector of a stored video clip to quantify the similarity between the video clip-level feature vectors. The comparison of the video clip-level feature vector of the query video clip and the stored video clip-level feature vector of the stored video clip produces a similarity score. Stored video clips associated with stored video clip-level feature vectors whose similarity scores satisfy a threshold similarity score are retrieved from the video database. In some embodiments, the k most similar stored video clips associated with video clip-level feature vectors whose similarity scores satisfy the threshold similarity score are retrieved from the video database.

As illustrated in FIG. 6, the AVR system 600 includes a video clip selector 606. The video clip selector 606 identifies an alignable video from the set of candidate video clips. The video clip selector 606 includes the frame level contextualizer 618. The frame level contextualizer 618 augments frame-level feature vectors with additional temporal context using any frame-level representation and any video clip length. After the temporal context augmentation, a frame-level feature vector captures not only the features associated with the single frame, but also how the frame fits into the overall video clip. For example, the additional temporal context augments the feature vector with global context information that represents whether the particular frame is part of the beginning of the video clip or near the end of the video clip.

The video clip selector 606 includes the optimal alignment manager 620. The optimal alignment manager 620 uses a distance metric to determine how similar a video clip of the set of candidate video clips is to the query video clip. For example, the optimal alignment manager 620 can perform dynamic time warping to determine an optimal alignment of a video in the set of candidate video clips and the query video clip. The optimal alignment quantifies the similarity between the temporally augmented feature vectors of the query video clip and the temporally augmented feature vectors of a video clip in the set of candidate video clips to identify frames of the query video clip and the candidate video clip that are the most aligned (e.g., semantically).

The video clip selector 606 includes the DRAQ manager 622. The DRAQ manager 622 identifies the alignable video clip from the set of candidate video clips as the video clip with the lowest DRAQ score. The DRAQ score is used as an alignability metric to identify pairs of semantically similar video clips based on a temporal understanding of the video clips. The DRAQ score represents the relative temporal alignment between a pair of video clips (e.g., the query video clip 102A and a video clip in the set of candidate video clips) using a per-frame representation of each video clip that captures global temporal information. The DRAQ score is independent of the lengths of each video clip of the pair of video clips.

In operation, the DRAQ manager 622 determines an average of multiple random alignments of the query video clip and the candidate video clip from the set of candidate video clips. If the DRAQ manager 622 determines that the optimal alignment value is lower than a random alignment value, then the DRAQ manager 622 determines that the video clips are temporally aligned. Accordingly, lower DRAQ scores indicate that the two video clips are temporally aligned.

The video clip selector 606 includes the ranker 624. The ranker 624 ranks each video clip of the candidate set of clips according to the DRAQ score, where video clips with lower DRAQ scores are ranked higher than video clips with higher DRAQ scores. In some embodiments, the video clip in the highest-ranking position (e.g., the video clip of the candidate set of video clips with the lowest DRAQ score) is selected as the most alignable video clip with respect to the query video clip.

As illustrated in FIG. 6, the AVR system 600 also includes a neural network manager 608. Neural network manager 608 may host a plurality of neural networks or other machine learning models, such as encoder 626. The encoder 626 can be any pretrained encoder or fine-tuned encoder trained to generate per-frame feature vectors of frames of a video clip. The neural network manager 608 may include an execution environment, libraries, and/or any other data needed to execute the machine learning models. In some embodiments, the neural network manager 608 may be associated with dedicated software and/or hardware resources to execute the machine learning models.

As illustrated in FIG. 6, the AVR system 600 also includes the alignment manager 612. The alignment manager 612 temporally aligns the query video clip with the alignable video clip. A pair of video clips is temporally aligned when a key event in both video clips occurs simultaneously (e.g., co-occurs exactly, coincides). One or both of the video clips of the pair of video clips (e.g., query video clip and the alignable video clip) may be warped such that the key event visually occurs at the same time (or near the same time).

As illustrated in FIG. 6, the AVR system 600 also includes the storage manager 610. The storage manager 610 maintains data for the AVR system 600. The storage manager 610 can maintain data of any type, size, or kind as necessary to perform the functions of the AVR system 600. The storage manager 610, as shown in FIG. 6, includes the video data 628 and the user preferences 630. The video data 628 can include per-frame feature vectors of frames of a video clip (e.g., the query video clip or a video clip of the set of candidate video clips retrieved from the video database), an aggregate frame-level feature vector (e.g., a clip-level feature vector of the query video clip or a video clip of the set of candidate video clips retrieved from the video database), or temporally augmented feature vectors (e.g., augmentation of each frame with temporal context information that represents whether the particular frame is part of the beginning of the video clip or near the end of the video clip).

In some embodiments, the user preferences 630 can indicate a preference for warping one particular video clip over another video clip. For example, the storage system 610 stores a first user preference 630 associated with a first user to freeze the timing data of the query video clip. Accordingly, the frame-ids of the query video clip are unchanged which visually presents itself as the playback speed of the query video clip not being adjusted when temporally aligning the query video clip and the aligned video clip. The storage system 610 can also store a second user preference 630 associated with a second user, indicating the second user's preference not to freeze the timing data of the query video clip. Accordingly, the playback speed of the query video clip can be warped or otherwise manipulated when temporally aligning the query video clip and the aligned video clip. In some embodiments, the user preferences 630 indicate one or more video databases from which to retrieve the set of candidate videos. Additionally or alternatively, the user preferences 630 can indicate a set of videos to be used as the candidate set of videos.

Each of the components of the AVR system 600 and their corresponding elements (as shown in FIG. 6) may be in communication with one another using any suitable communication technologies. It will be recognized that although components 602-612 and their corresponding elements are shown to be separate in FIG. 6, any of components 602-612 and their corresponding elements may be combined into fewer components, such as into a single facility or module, divided into more components, or configured into different components as may serve a particular embodiment.

The components 602-612 and their corresponding elements can comprise software, hardware, or both. For example, the components 602-612 and their corresponding elements can comprise one or more instructions stored on a computer-readable storage medium and executable by processors of one or more computing devices. When executed by the one or more processors, the computer-executable instructions of the AVR system 600 can cause a client device and/or a server device to perform the methods described herein. Alternatively, the components 602-612 and their corresponding elements can comprise hardware, such as a special purpose processing device to perform a certain function or group of functions. Additionally, the components 602-612 and their corresponding elements can comprise a combination of computer-executable instructions and hardware.

Furthermore, the components 602-612 of the AVR system 600 may, for example, be implemented as one or more stand-alone applications, as one or more modules of an application, as one or more plug-ins, as one or more library functions or functions that may be called by other applications, and/or as a cloud-computing model. Thus, the components 602-612 of the AVR system 600 may be implemented as a stand-alone application, such as a desktop or mobile application. Furthermore, the components 602-612 of the AVR system 600 may be implemented as one or more web-based applications hosted on a remote server. Alternatively, or additionally, the components of the AVR system 600 may be implemented in a suite of mobile device applications or "apps." To illustrate, the components of the AVR system 600 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

As shown, the AVR system 600 can be implemented as a single system. In other embodiments, the AVR system 600 can be implemented in whole, or in part, across multiple systems. For example, one or more functions of the AVR system 600 can be performed by one or more servers, and one or more functions of the AVR system 600 can be performed by one or more client devices. The one or more servers and/or one or more client devices may generate, store, receive, and transmit any type of data used by the AVR system 600, as described herein.

In one implementation, the one or more client devices can include or implement at least a portion of the AVR system 600. In other implementations, the one or more servers can include or implement at least a portion of the AVR system 600. For instance, the AVR system 600 can include an application running on the one or more servers or a portion of the AVR system 600 can be downloaded from the one or more servers. Additionally or alternatively, the AVR system 600 can include a web hosting application that allows the client device(s) to interact with content hosted at the one or more server(s).

For example, upon a client device accessing a webpage or other web application hosted at the one or more servers, in one or more embodiments, the one or more servers can provide access the user interface manager 602. Using the interface manager 602, the client device can generate a request (e.g., via a user input) to identify a semantically similar and temporally alignable video clip with respect to a query video clip. The client device can provide the query video clip and the request to one or more servers. Upon receiving the request, the one or more servers can automatically perform the methods and processes described above to identify a semantically similar video clip from a set of videos stored in a video database and temporally align the semantically similar video clip with the query video clip. The one or more servers can provide the aligned query video clip and the semantically similar video clip to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

Figure 7:
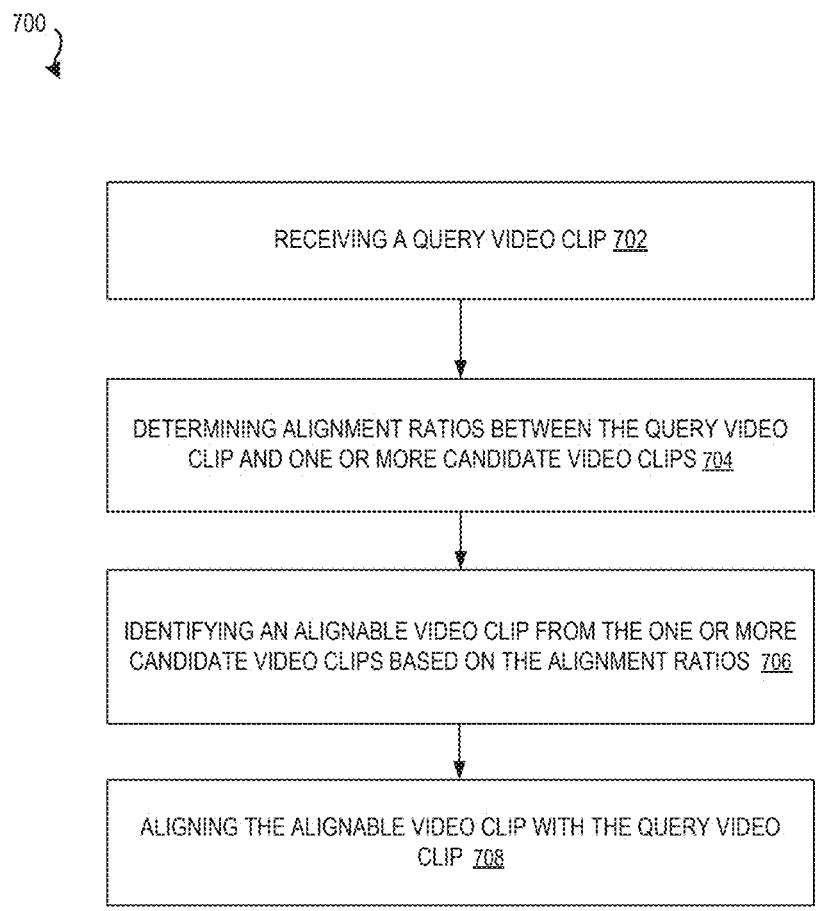
FIG. 7 illustrates a flowchart of a series of acts in a method of retrieving a video for a semantic and temporal alignment between a pair of video clips, in accordance with one or more embodiments.

FIGS. 1-6, the corresponding text, and the examples, provide a number of different systems and devices that allow a user to retrieve videos for a semantic and temporal alignment between a pair of video clips. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of retrieving a video for a semantic and temporal alignment between a pair of video clips in accordance with one or more embodiments. In one or more embodiments, the method 700 is performed in a digital medium environment that includes the aligned video retrieval system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving a query video clip. The query video clip can include a sequence of a consecutive set of frames (e.g., an entire duration of a video or a portion of the video) that portrays content. Each frame portrays a still image of the content. The frames, when played at a playback speed, are perceived by a human as portraying motion.

As illustrated in FIG. 7, the method 700 includes an act 704 of determining alignment ratios between the query video clip and one or more candidate video clips. The one or more candidate video clips are retrieved from a video database as being video clips that are semantically similar to the query video clip. For example, cosine similarity is applied to a video clip-level feature vector of the query video clip and a video clip-level feature vector of a stored video clip to quantify the similarity between the video clip-level feature vectors. The video clip-level feature vector represents the average of the frame-level feature vectors of a video clip. The comparison of the video clip-level feature vector of the query video clip and the stored video clip-level feature vector of the stored video clip produces a similarity score. Stored video clips associated with stored video clip-level feature vectors whose similarity scores satisfy a threshold similarity score are retrieved from the video database as video clips of the set of candidate video clips. Both the query video clip and the set of candidate video clips are augmented with temporal context information to generate temporally augmented feature vectors. After the temporal context augmentation, a frame-level feature vector of the query video clip and each video of the set of candidate video clips captures not only the features associated with the single frame, but also how the frame fits into the overall query video clip and candidate video clip respectively.

The alignment ratio is a ratio of an optimal alignment to a random alignment. The optimal alignment is the minimum cumulative distance between the temporally augmented feature vectors of the query video clip and the temporally augmented feature vectors of the candidate video clip, representing the frames of the query video clip and the candidate video clip that are the most aligned (e.g., semantically). The random alignment is an average of k random alignments between the temporally augmented feature vectors of the query video clip and the temporally augmented feature vectors of the candidate video clip.

As illustrated in FIG. 7, the method 700 includes an act 706 of identifying an alignable video clip from the one or more candidate video clips based on the alignment ratios. An alignment ratio is determined for each video clip of the set of candidate video clips such that each pair of video clips (e.g., the query video clip and a candidate video clip of the set of candidate video clips) receives an alignment ratio score, referred to herein as a DRAQ score. If the optimal alignment value is lower than a random alignment value, (e.g., a small alignment ratio score) then the pair of video clips are temporally aligned. If the optimal alignment value is higher than a random alignment value (e.g., a high alignment ratio score) then the optimal alignment is based on the similarity of frames between the two video clips (e.g., the query video clip and the candidate video clip) rather than the temporal alignment of the frames of the two video clips. Accordingly, lower alignment ratio scores indicate that the two video clips are temporally aligned. The candidate video clip in the highest ranking position (e.g., the video clip of the candidate set of video clips with the lowest alignment ratio score) can be selected as the most alignable video clip with respect to the query video clip.

As illustrated in FIG. 7, the method 700 includes an act 708 of aligning the alignable video clip with the query video clip. For example, the optimal alignment between the alignable video clip and the query video clip is used to assign frames of the query video clip to frames of the alignable video clip to warp (or otherwise align) the query video clip and the alignable video clip in a nonlinear fashion.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
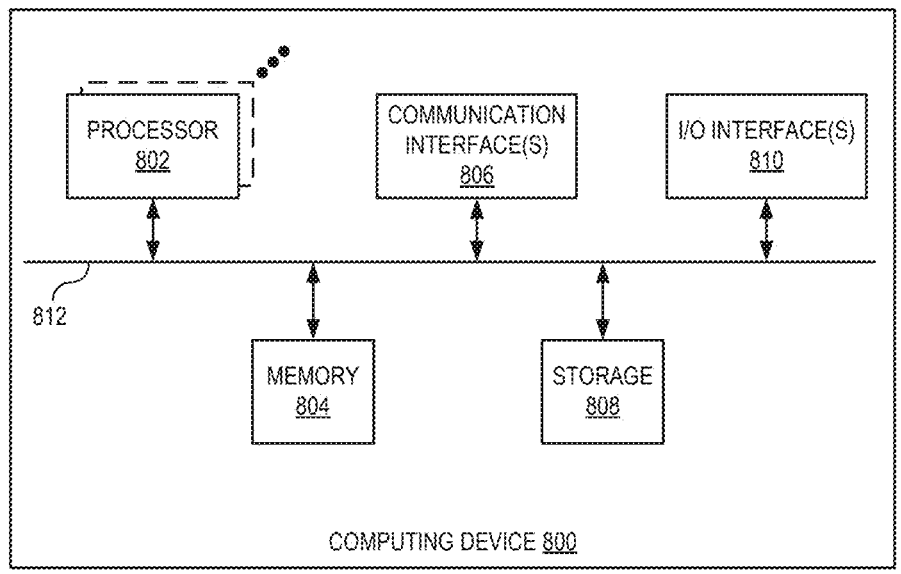
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the aligned video retrieval system. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
    receiving a query video clip;
    determining alignment ratios between the query video clip and one or more candidate video clips using temporally augmented frame-level features of the query video clip and temporally augmented frame-level features of a candidate video clip from the one or more candidate video clips;
    identifying an alignable video clip from the one or more candidate video clips based on the alignment ratios; and
    aligning the alignable video clip with the query video clip.

2. The method of claim 1, wherein an alignment ratio is a ratio of an optimal alignment to a random alignment between the query video clip and a candidate video clip from the one or more candidate video clips.

3. The method of claim 1, wherein determining the alignment ratios between the query video clip and the one or more candidate video clips further comprises:
    encoding frames of a first sequence of frames of the query video clip to generate a sequence of frame-level feature vectors of the query video clip; and
    concatenating a frame-level feature vector of the sequence of frame-level feature vectors of the query video clip with a cumulative sum of prior feature vectors of the sequence of frame-level feature vectors of the query video clip to obtain augmented frame-level feature vectors of the query video clip.

4. The method of claim 3, wherein determining the alignment ratios between the query video clip and the one or more candidate video clips further comprises:
    encoding frames of a second sequence of frames of a candidate video clip from the one or more candidate video clips to generate a sequence of frame-level features of the candidate video clip; and
    concatenating a frame-level feature vector of the sequence of frame-level feature vectors of the candidate video clip with a cumulative sum of prior feature vectors of the sequence of frame-level feature vectors of the candidate video clip to obtain augmented frame-level feature vectors of the candidate video clip.

5. The method of claim 4, wherein an optimal alignment is an optimal assignment of entries of the augmented frame-level feature vectors of the query video clip to entries of the augmented frame-level feature vectors of the candidate video clip, wherein the optimal assignment of entries is based on a minimum similarity between the entries of the augmented frame-level feature vectors of the query video clip and the entries of the augmented frame-level feature vectors of the candidate video clip.

6. The method of claim 4, wherein a random alignment is a random assignment of entries of the augmented frame-level feature vectors of the query video clip to entries of the augmented frame-level feature vectors of the candidate video clip, wherein the random assignment of entries is based on a similarity between random entries of augmented frame-level feature vectors of the query video clip and random entries of the augmented frame-level feature vectors of the candidate video clip.

7. The method of claim 6, wherein the random alignment is an average of a number of random assignments of entries of the augmented frame-level feature vectors of the query video clip to entries of the augmented frame-level feature vectors of the candidate video clip.

8. The method of claim 1, further comprising:
identifying the one or more candidate video clips from a video database based on a similarity of the query video clip to a video clip of the video database.

9. The method of claim 8, wherein the similarity of the query video clip to the video clip of the video database is determined using an aggregated feature vector of frame-level feature vectors of the query video clip and an aggregated feature vector of frame-level feature vectors of the video clip.

10. A non-transitory computer-readable medium storing executable instructions, which when executed by a processing device, cause the processing device to perform operations comprising:
receiving a query video clip;
determining alignment ratios between the query video clip and one or more candidate video clips using temporally augmented frame-level features of the query video clip and temporally augmented frame-level features of a candidate video clip from the one or more candidate video clips;
identifying an alignable video clip from the one or more candidate video clips based on the alignment ratios; and
aligning the alignable video clip with the query video clip.

11. The non-transitory computer-readable medium of claim 10, wherein an alignment ratio is a ratio of an optimal alignment to a random alignment between the query video clip and a candidate video clip from the one or more candidate video clips.

12. The non-transitory computer-readable medium of claim 10, wherein determining the alignment ratios between the query video clip and the one or more candidate video clips, further causes the processing device to perform operations comprising:
encoding frames of a first sequence of frames of the query video clip to generate a sequence of frame-level feature vectors of the query video clip; and
concatenating a frame-level feature vector of the sequence of frame-level feature vectors of the query video clip with a cumulative sum of prior feature vectors of the sequence of frame-level feature vectors of the query video clip to obtain augmented frame-level feature vectors of the query video clip.

13. The non-transitory computer-readable medium of claim 12, wherein determining the alignment ratios between the query video clip and the one or more candidate video clips, further causes the processing device to perform operations comprising:
encoding frames of a second sequence of frames of a candidate video clip from the one or more candidate video clips to generate a sequence of frame-level features of the candidate video clip; and
concatenating a frame-level feature vector of the sequence of frame-level feature vectors of the candidate video clip with a cumulative sum of prior feature vectors of the sequence of frame-level feature vectors of the candidate video clip to obtain augmented frame-level feature vectors of the candidate video clip.

14. The non-transitory computer-readable medium of claim 13, wherein an optimal alignment is an optimal assignment of entries of the augmented frame-level feature vectors of the query video clip to entries of the augmented frame-level feature vectors of the candidate video clip, wherein the optimal assignment of entries is based on a minimum similarity between the entries of the augmented frame-level feature vectors of the query video clip and the entries of the augmented frame-level feature vectors of the candidate video clip.

15. The non-transitory computer-readable medium of claim 13, wherein a random alignment is a random assignment of entries of the augmented frame-level feature vectors of the query video clip to entries of the augmented frame-level feature vectors of the candidate video clip, wherein the random assignment of entries is based on a similarity between random entries of augmented frame-level feature vectors of the query video clip and random entries of the augmented frame-level feature vectors of the candidate video clip.

16. A system comprising:
a memory component; and
a processing device coupled to the memory component, the processing device to perform operations comprising:
receiving a query video clip;
determining a set of aggregated frame-level feature vectors for the query video clip;
retrieving one or more candidate video clips based on a comparison of the set of aggregated frame-level feature vectors for the query video clip to a set of stored aggregated frame-level feature vectors for one or more candidate video clips;
identifying an alignable video clip from the one or more candidate video clips based on alignment ratios between the query video clip and the one or more candidate video clips; and
aligning the alignable video clip with the query video clip.

17. The system of claim 16, wherein an alignment ratio is a ratio of an optimal alignment to a random alignment between the query video clip and a candidate video clip from the one or more candidate video clips.

18. The system of claim 16, wherein determining the alignment ratios between the query video clip and the one or more candidate video clips causes the processing device to perform further operations comprising:
encoding frames of a first sequence of frames of the query video clip to generate a sequence of frame-level feature vectors of the query video clip; and
concatenating a frame-level feature vector of the sequence of frame-level feature vectors of the query video clip with a cumulative sum of prior feature vectors of the sequence of frame-level feature vectors of the query video clip to obtain augmented frame-level feature vectors of the query video clip.

19. The system of claim 18, wherein determining the alignment ratios between the query video clip and the one or more candidate video clips causes the processing device to perform further operations comprising:
  encoding frames of a second sequence of frames of a candidate video clip from the one or more candidate video clips to generate a sequence of frame-level features of the candidate video clip; and
  concatenating a frame-level feature vector of the sequence of frame-level feature vectors of the candidate video clip with a cumulative sum of prior feature vectors of the sequence of frame-level feature vectors of the candidate video clip to obtain augmented frame-level feature vectors of the candidate video clip.

20. The system of claim 19, wherein an optimal alignment is an optimal assignment of entries of the augmented frame-level feature vectors of the query video clip to entries of the augmented frame-level feature vectors of the candidate video clip, wherein the optimal assignment of entries is based on a minimum similarity between the entries of the augmented frame-level feature vectors of the query video clip and the entries of the augmented frame-level feature vectors of the candidate video clip.

\* \* \* \* \*